United States Patent
Qi et al.

(10) Patent No.: US 7,792,879 B2
(45) Date of Patent: Sep. 7, 2010

(54) EFFICIENT HEAP UTILIZATION AND PARTITIONING

(75) Inventors: Ji Qi, Beijing (CN); Xiao-Feng Li, Beijing (CN)

(73) Assignee: Intel Corporation, Santa Clara, CA (US)

( * ) Notice: Subject to any disclaimer, the term of this patent is extended or adjusted under 35 U.S.C. 154(b) by 395 days.

(21) Appl. No.: 12/046,162

(22) Filed: Mar. 11, 2008

(65) Prior Publication Data
US 2009/0234897 A1   Sep. 17, 2009

(51) Int. Cl.
G06F 17/30 (2006.01)
(52) U.S. Cl. .................. 707/813; 711/129; 711/173
(58) Field of Classification Search .............. None
See application file for complete search history.

(56) References Cited

U.S. PATENT DOCUMENTS 7,237,064 B2   6/2007   Lewis

OTHER PUBLICATIONS

Hicks et al., "A Study of Large Object Spaces", In: Proceedings of ISMM1998.
Soman et al., "Dynamic selection of application-specific garbage collectors", In: Proceedings of ISMM2004.
Barrett et al., "Garbage Collection using a Dynamic Threatening Boundary", In: Proceedings of PLDI1995.

*Primary Examiner*—Kavita Padmanabhan
(74) *Attorney, Agent, or Firm*—Hanley, Flight & Zimmerman, LLC.

(57) ABSTRACT

A method comprising calculating first and second allocation speeds respectively for at least a first space and a second space in a runtime environment's memory space; and partitioning the runtime environment's memory space in proportion to said first and second space's respective allocation speeds so that the first space is filled to a first threshold level approximately at the same time as the second space is filled to a second threshold level.

8 Claims, 3 Drawing Sheets

EFFICIENT HEAP UTILIZATION AND PARTITIONING

COPYRIGHT & TRADEMARK NOTICES

A portion of the disclosure of this patent document contains material, which is subject to copyright protection. The owner has no objection to the facsimile reproduction by any one of the patent document or the patent disclosure, as it appears in the Patent and Trademark Office patent file or records, but otherwise reserves all copyrights whatsoever.

Certain marks referenced herein may be common law or registered trademarks of third parties affiliated or unaffiliated with the applicant or the assignee. Use of these marks is for providing an enabling disclosure by way of example and shall not be construed to limit the scope of this invention to material associated with such marks.

TECHNICAL FIELD

The present invention relates generally to computing system memory management, and more specifically to a method for providing efficient heap utilization in garbage collection systems with multiple allocation spaces.

BACKGROUND

In computer science, memory is allocated from a large pool of unused memory space called the heap. For efficiency, the heap is managed by way of different processes. The garbage collection process is a form of automatic memory management widely used in managed runtime systems, such as Java Virtual Machine (JVM) and Common Language Runtime (CLR).

A logic code (e.g., a garbage collector) is generally executed to reclaim memory that is no longer being used (i.e., garbage). A modern, high performance garbage collector usually manages large objects separately from other objects. Large objects refer to those objects that are bigger in size than a threshold value. For large objects, the overhead of moving/copying in memory is high. Some garbage collectors use a separate memory space (e.g., a managed memory region called large object space or LOS) for storing large objects. A garbage collector may manage the LOS with non-moving garbage collection algorithms (e.g., mark-sweep, tread-mill, etc.).

On the other hand, a non-LOS portion of the heap may be managed by a moving/copying garbage collection algorithm (e.g., semi-space, sliding-compaction, etc.) that has a better performance for non-large objects than a non-moving counterpart. In this way, a single garbage collector can achieve both of the advantages of copying and non-copying garbage collectors simultaneously in one system. The garbage collection design with LOS and non-LOS partitions the heap into two spaces for large objects and non-large objects respectively.

A garbage collector may also place objects into a pinned (i.e., not moveable) space separated from the space for moveable objects. Alternatively, a garbage collector may allocate a special storage space for immortal objects (i.e., objects that are always live during the application's execution time).

Accordingly, multi-space garbage collectors can be classified into two categories. In the first category, the garbage collector only allocates objects in one space (e.g., in a generational garbage collector the objects are only allocated in young object space). In the second category, objects are allocated to more than one space (e.g., garbage collectors with LOS/non-LOS spaces, or pinned/unpinned spaces, or immortal/mortal spaces).

Because the objects' size distributions vary from one application to another and even from one execution phase to the next within one application, it is impossible to statically predefine a proper heap partitioning for LOS and non-LOS in the garbage collection schemes with multiple spaces. Thus, the current, LOS garbage collectors suffer from a problem which occurs when the two spaces don't fit well with the dynamic variations of object size distribution at runtime. This problem leads to unbalanced storage space utilization and negatively impacts the overall efficiency of the garbage collection process.

Systems and methods are needed to improve upon the current garbage collection schemes to achieve maximum garbage collection efficiency.

BRIEF DESCRIPTION OF THE DRAWINGS

Embodiments of the present invention are understood by referring to the figures in the attached drawings, as provided below.

Features, elements, and aspects of the invention that are referenced by the same numerals in different figures represent the same, equivalent, or similar features, elements, or aspects, in accordance with one or more embodiments.

DETAILED DESCRIPTION OF EXAMPLE EMBODIMENTS

Figure 1:
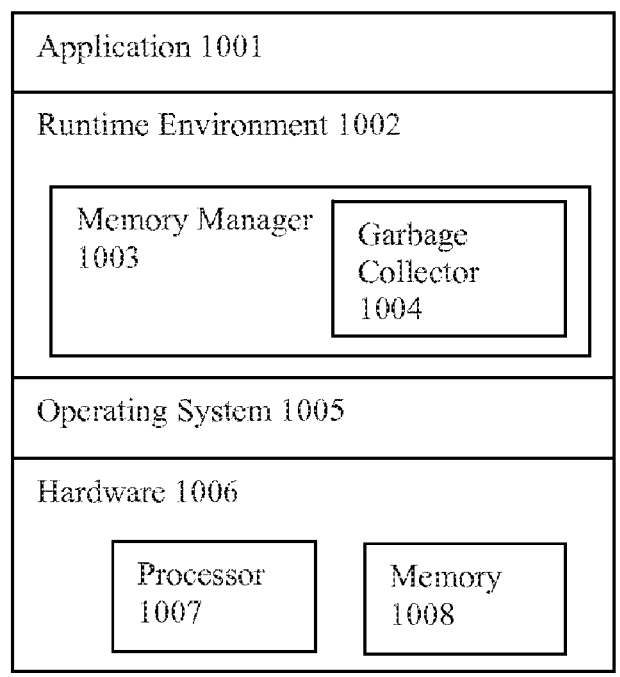
FIG. 1 illustrates a block diagram of a computing system which uses a memory manager with garbage collection, in accordance with one embodiment.

A method and system for providing efficient heap utilization in garbage collection systems is provided. In the following, one or more embodiments are disclosed by way of example as applicable to garbage collection systems with multiple allocation spaces, including but not limited to garbage collection systems with LOS/non-LOS partitioning, pinned/unpinned spaces, and immortal/mortal spaces. It is noteworthy that the scope of the invention should not be construed as limited to said exemplary embodiments. The disclosed system and method may be also applicable to garbage collection systems with nested allocation spaces or any other type of space allocation mechanism.

For purposes of summarizing, certain aspects, advantages, and novel features of the invention have been described herein. It is to be understood that not all such advantages may be achieved in accordance with any one particular embodiment of the invention. Thus, the invention may be embodied or carried out in a manner that achieves or optimizes one advantage or group of advantages without achieving all advantages as may be taught or suggested herein.

A system, in accordance to one embodiment comprises logic unit to calculate first and second allocation speeds respectively for at least a first space and a second space in a runtime environment's memory space; and logic unit to partition the runtime environment's memory space in proportion to said first and second space's respective allocation speeds so that the first space is filled to a first threshold level approximately at the same time as the second space is filled to a second threshold level.

The first allocation speed is approximately equal to total bytes allocated per unit time in the first space and wherein the second allocation speed is approximately equal to total bytes allocated per unit time in the second space. Garbage collection may be initiated in the first space and the second space when the first or the second threshold is met. The partitioning for the first and second spaces is performed dynamically according to the following formula:

$$SpaceSize1 = \frac{AllocSpeed1}{(AllocSpeed1 + AllocSpeed2)} * (FreeSize1 + FreeSize2) + SurvivorSize1$$

$$SpaceSize2 = \frac{AllocSpeed2}{(AllocSpeed1 + AllocSpeed2)} * (FreeSize1 + FreeSize2) + SurvivorSize2$$

SpaceSize1: size of the first space
SpaceSize2: size of the second space
AllocSpeed1: the allocation speed of the first space,
AllocSpeed2: the allocation speed of the second space,
FreeSize1: fee space size in the first space,
FreeSize2: free space size in the second space,
SurvivorSize1: the used space size in first space,
SurvivorSize2: the used space size in second space.

In accordance with another embodiment, a system comprising one or more logic units is provided. The one or more logic units are configured to perform the functions and operations associated with the above-disclosed methods. In accordance with yet another embodiment, a computer program product comprising a computer useable medium having a computer readable program is provided. The computer readable program when executed on a computer causes the computer to perform the functions and operations associated with the above-disclosed methods.

One or more of the above-disclosed embodiments in addition to certain alternatives are provided in further detail below with reference to the attached figures. It should be noted that in the following certain embodiments are disclosed, by way of example, as applicable to certain specific implementations and naming conventions (e.g., LOS, non-LOS, MOS, etc.). The invention is not, however, limited to any particular embodiment disclosed and should not be construed as such, as the disclosed principles and ideas can be applied to other implementations not disclosed herein for the purpose of brevity.

Referring to FIG. 1, an exemplary system according to one aspect of the invention comprises a runtime environment 1002 on which application 1001 may be executed. The runtime environment 1002 incorporates a memory manager 1003 having a garbage collector module 1004. In alternative embodiments, the garbage collector 1004 may not be in the memory manager 1003, and may be a separate application program apart from the runtime environment 1002. The runtime environment 1003 is supported by an operating system 1005 running over a hardware 1006 environment which may comprise at least one processor 1007 and memory 1008, depending on implementation.

Figure 2:
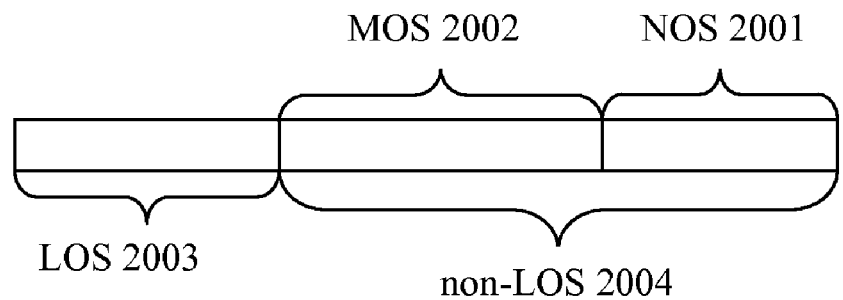
FIG. 2 illustrates a heap layout in a generational garbage collection system design with three allocation spaces, in accordance with one embodiment.

Referring to FIG. 2, a garbage collector 1004 according to one embodiment partitions the heap into several spaces, at least one for newly allocated non-large objects referred to by way of example as NOS (nursery object space) 2001, at least one for the objects that have survived NOS collection referred to by way of example as MOS (mature object space) 2002, and at least one for large object space referred to by way of example as LOS 2003. Depending on implementation one or more of the above spaces may be merged together without detracting from the scope of the invention. For example, NOS 2001 and MOS 2002 may be combined into non-LOS 2004, as shown in FIG. 2.

The garbage collector (GC) 1004 may adjust the heap partitioning such that when a collection is triggered by either space, both spaces are fully filled. In this way, the heap is fully utilized. To achieve this effect, allocation speed (i.e., the total bytes allocated in unit time) for each space is calculated. Depending on implementation and storage size associated with each space, the allocation speed may vary from one space to another. If the space sizes are proportional to their respective allocation speeds, then each of the spaces is likely to become full at the same time as the others.

Depending on implementation, the computation of allocation speed may be flexible. For example, it may be the total allocated bytes from last collection, or the average value of the speeds in last few collections. In certain embodiments, using the allocated bytes from last collection may be insufficient. Thus, the allocation speed computation may be associated with the garbage collection algorithm for more precise results, in accordance with one embodiment.

Figure 3:
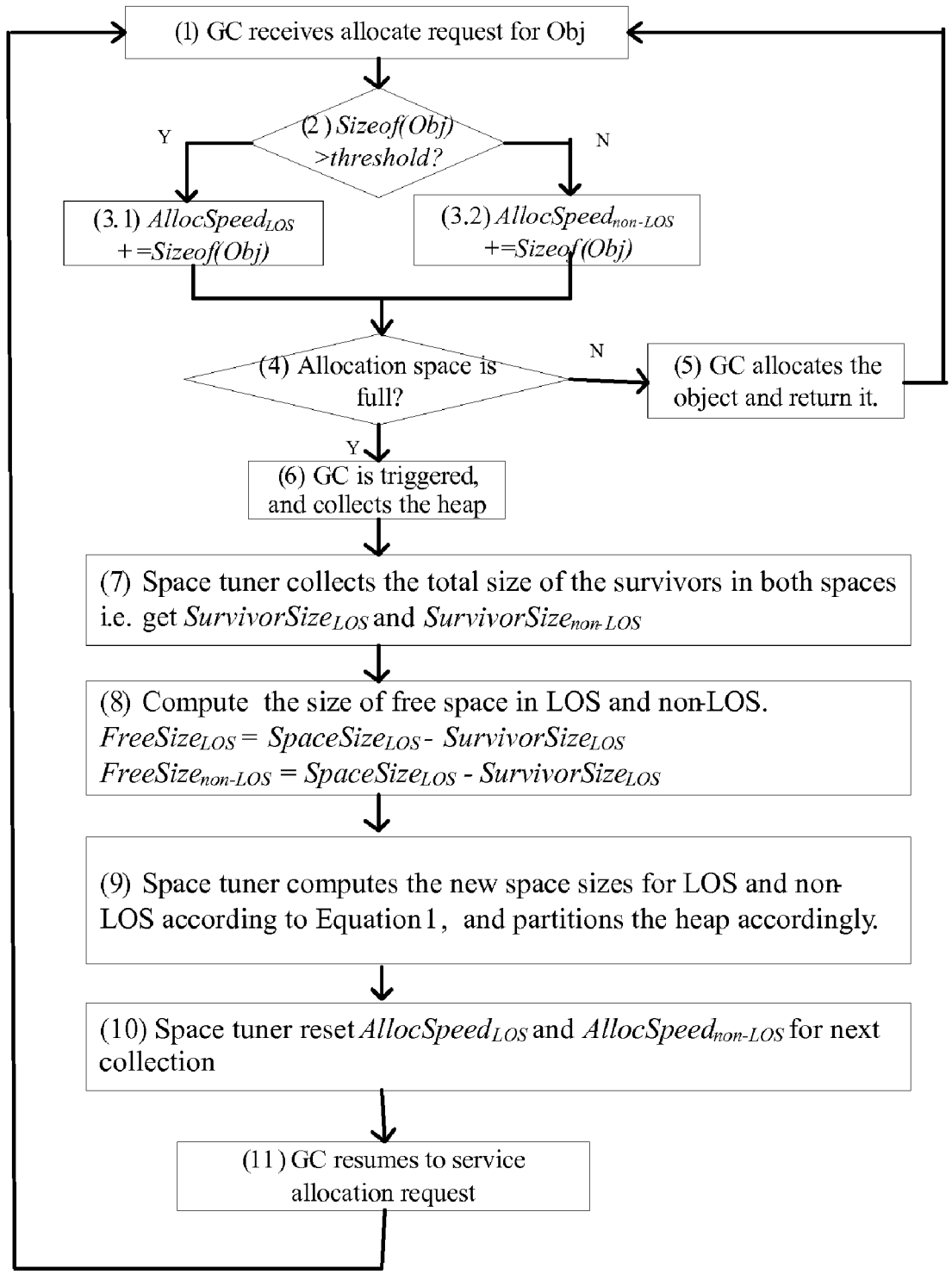
FIG. 3 is a process flow diagram in accordance with an embodiment with two allocations spaces.

Referring to FIG. 3, garbage collector may receive a request to allocate an object, referred to by way of example as "Obj" (Block 1). It is determined if Obj is a large object by comparing the size of Obj to the size threshold of a large object (Block 2); the size of the object is referred to by way of example as "Sizeof(Obj)." If Obj is a large object, the allocation speed of the LOS is updated by adding Sizeof(Obj) (Block 3.1). The allocation speed of the LOS is referred to by way of example as AllocSpeedLOS. If Obj is not a large object, the system (e.g., a space tuner) updates the allocation speed of the non-LOS, referred to by way of example as AllocSpeednon-LOS, by adding Sizeof(Obj)(Block 3.2).

It is then determined whether the allocation space (LOS or non-LOS) for Obj is filled to a first threshold (e.g., full)(Block 4). If the allocation space is not full, the garbage collector allocates the object Obj and returns it (Block 5). Otherwise, the garbage collector triggers a garbage collection process to collect the garbage in the heap (Block 6). The system may collect the total used space size of the survivors, represented as SurvivorSizeLOS for LOS and SurvivorSizenon-LOS for non-LOS (Block 7). The system computes the free space sizes of at least one of the LOS and non-LOS spaces (Block 8).

As shown, the free space size in LOS, represented as FreeSizeLOS is equal to space size of LOS, represented as SpaceSizeLOS, minus the size of the survivors in LOS, represented as SurvivorSizeLOS. The free space size in non-LOS, represented as FreeSizenon-LOS is equal to space size of non-LOS, represented as SpaceSizenon-LOS, minus the size of the survivors in LOS, represented as SurvivorSizenon-LOS. The system may compute the new space sizes for LOS and non-LOS, and partitions the heap accordingly (Block 8).

In one embodiment, the space size for LOS, represented by way of example as SpaceSizeLOS, is calculated by dividing the allocation speed of LOS (e.g., AllocSpeedLOS) by the sum of the allocation speed of LOS (e.g., AllocSpeedLOS) and the allocation speed of non-LOS (e.g., AllocSpeednon-LOS); multiplying the result by the sum of the freed space size in LOS (e.g., FreeSizeLOS) and freed space size in non-LOS (e.g., FreeSizenon-LOS); and then adding the used space size in LOS by the survivors after the collection (e.g., SurvivorSizeLOS) to the product.

In other words, SpaceSizeLOS may be calculated according to the following Equation (1):

$$SpaceSize_{LOS} = \frac{AllocSpeed_{LOS}}{(AllocSpeed_{LOS} + AllocSpeed_{non\text{-}LOS})} * (FreeSize_{LOS} + FreeSize_{non\text{-}LOS}) + SurvivorSize_{LOS}$$

wherein:
- $SpaceSize_{LOS}$: the space size of LOS
- $AllocSpeed_{LOS}$: the allocation speed of LOS,
- $AllocSpeed_{non\text{-}LOS}$: the allocation speed of non-LOS
- $FreeSize_{LOS}$: the freed space size in LOS after the collection
- $FreeSize_{non\text{-}LOS}$: the freed space size in non-LOS after the collection
- $SurvivorSize_{LOS}$: the used space size in LOS by the survivors after the collection.

The system using the above Equation 1 computes the new space size for LOS (and non-LOS using a similar approach) and dynamically partitions the heap accordingly. The system may reset the allocation speeds variables for the LOS and non-LOS for the next collection (Block 10). The allocation speed variable for LOS is represented as AllocSpeedLOS and the allocation speed variable for non-LOS is represented as AllocSpeednon-LOS, by way of example. Accordingly, garbage collection resumes to service allocation requests (Block 11).

Figure 4:
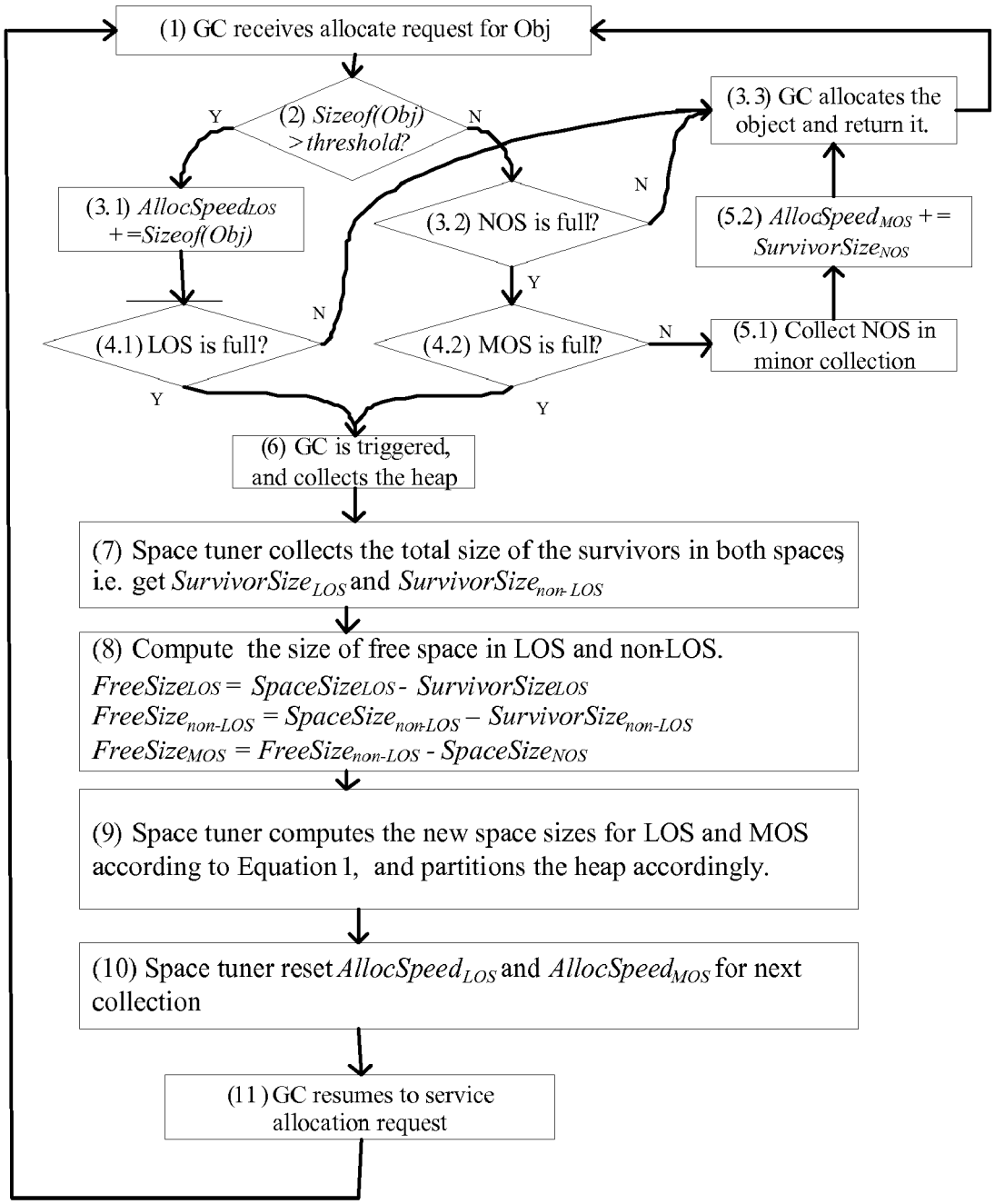
FIG. 4 is a process flow diagram in accordance with an embodiment with multiple allocation spaces.

FIG. 4 illustrates a space tuning method similar to that of FIG. 3, wherein instead of two spaces multiple spaces are tuned. In accordance with this method, the garbage collector adjusts the heap partitioning such that when a collection is triggered by either space, both spaces are filled to a predetermine (e.g., maximum threshold). Accordingly, the space tuning method disclosed above can be applied to more than two spaces. The methodology is similar in that the garbage collector will desirably compute the allocation speeds of all the spaces, and then uses them to compute and allocate the new sizes for the spaces in the collections.

As shown in FIG. 4, certain adjustments are made where not all the spaces are collected in the same collections. In this situation, if a kind of collection can be equally triggered by a few spaces, these space sizes may be tuned during the collections of that kind. Referring back to FIG. 2, a generational garbage collector may be used to partition the heap into three spaces (e.g., NOS, MOS and LOS). In such a setting, when NOS is filled to a certain threshold (e.g., a full state), the garbage collector will trigger a first level of collection (e.g., minor collection), which collects NOS, by for example promoting the survivors to MOS. When MOS or LOS is filled to a certain threshold (e.g., full), a second level of collection (e.g., a major collection) may be triggered, which desirably is applied to a predefined portion of the heap (e.g., the entire heap).

Accordingly, since a second level of collection (e.g., a major collection) can be triggered by either LOS or MOS, their space sizes can be fine tuned in various collections (e.g., major collections). In this manner, when a major collection happens, both LOS and MOS are filled to a desirable level (e.g., almost full) to ensure the best heap utilization and application performance. In the exemplary embodiment illustrated in FIG. 4, when NOS is filled at a certain capacity (e.g., full), a first level of collection (e.g., a minor collection is triggered), but the spaces are not tuned. Desirably, the allocation speed for LOS calculated according to the same principals as discussed with reference to FIG. 3, while the allocation speed of MOS is calculated according to the total size of the objects that have been promoted from NOS to MOS after last time major collection.

In more detail, referring to FIG. 4, when the garbage collector receives a request to allocate an object (Obj)(Block 1), the garbage collector checks if Obj is a large object by comparing the size of Obj to the size threshold of a large object (Block 2). If Obj is a large object, the allocation speed of the LOS is updated by adding size of the Obj (block 3.1). The garbage collector then checks if the LOS is filled to a first threshold (e.g., full)(Block 4.1). If so, the garbage collector allocates Obj and returns it (Block 3.3). If LOS is not full, the garbage collector triggers a garbage collection process and collects the heap (Block 6).

If Obj is not a large object, it is determined whether the NOS is filled to a certain threshold (e.g., full)(Block 3.2). If the NOS is not full, the garbage collector allocates Obj and returns it. Otherwise, it is determined whether the MOS is filled to a certain threshold (e.g., full)(Block 4.2). If not, the garbage collector collects the NOS in a first collection level (e.g., minor collection)(Block 5.1) and then the space tuner updates the allocation speed of the MOS (e.g., AllocSpeedMOS), by adding the survivor size of the NOS (Block 5.2); and then allocates the object and returns it. If MOS is filled to a certain threshold, garbage collection is triggered to collect the heap (Block 6).

After a garbage collection is triggered, the space tuner collects the total used space size of the survivors (Block 7), represented as SurvivorSizeLOS for LOS and SurvivorSizenon-LOS for non-LOS. The total size of the survivors is total size of the survivors in the LOS added to the total size of the survivors in the non-LOS. The space tuner computes the free space sizes in LOS (Block 8), represented as FreeSizeLOS, non-LOS, represented as FreeSizenon—LOS, and MOS, represented as FreeSizeMOS. The free space size in LOS is equal to space size of LOS, represented by SpaceSizeLOS minus the size of the survivors in LOS, represented as SurvivorSizeLOS. The free space size in non-LOS is equal to space size of non-LOS, represented by SpaceSizeLOS minus the size of the survivors in non-LOS, represented as SurvivorSizeLOS. The free space size in MOS is equal to the free space size of non-LOS, represented as FreeSizenon-LOS, minus the space size of NOS, represented as SpaceSizeNOS.

The space tuner computes the new space sizes for LOS and MOS, according to the exemplary Equation (1) discussed above and partitions the heap accordingly (Block 9). The space tuner, in one embodiment, resets the allocation speeds variables for the LOS and MOS for the next collection (Block 10). The allocation speed variable for LOS is represented as AllocSpeedLOS and the allocation speed variable for MOS is represented as AllocSpeedMOS. The garbage collection resumes to service allocation request (Block 11).

In an exemplary embodiment multiple allocation spaces may be nested, where the allocation spaces are structured at multiple hierarchical levels such that allocation spaces at the same level in the hierarchy are adjusted. A garbage collector may collect the sub-spaces within a parent space. This approach may make it difficult to compute the allocation speed at the parent space level. In this situation, the total objects size in the parent space is computed after and before the last collection in the parent space. The difference between the two is used to approximate the allocation speed of the parent space.

Based on the LOS/non-LOS heap partitioning, a non-generational garbage collection system may have a nested space inside non-LOS, where non-LOS as a whole is managed with sliding-compaction while the nested space is managed by a copying collector. Desirably, when there is a large amount of free space in the non-LOS, the copying collector is used to copy the living objects from one part of the non-LOS to another. When the LOS or the non-LOS is filled to a certain level (e.g., full), a heap collection is triggered to collect both the LOS and non-LOS garbage.

In the above embodiment, the boundary between the LOS and the non-LOS may be adjusted for maximum heap utilization and the allocation speed of the non-LOS may be computed accordingly. Because the objects in the non-LOS may have been collected by the copying collector, it may not be possible to determine the total allocated space by adding together the allocated space in the non-LOS between two heap collections. Instead, the allocation speed may be approximated by subtracting the total objects size in the parent space after its last collection from the total objects size before the collection.

Depending on implementation, it is possible that the present invention can take the form of an entirely hardware embodiment, an entirely software embodiment or an embodiment containing both hardware and software elements. A software embodiment may include, but not be limited to, to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Other components may be coupled to the system. Input/output or I/O devices (including but not limited to keyboards, displays, pointing devices, etc.) can be coupled to the system either directly or through intervening I/O controllers. Network adapters (e.g., modem, cable modem, Ethernet cards) may also be coupled to the system to enable the data processing system to become coupled to other data processing systems or remote printers or storage devices through intervening private or public networks.

It should be understood that the logic code, programs, modules, processes, methods, and the order in which the respective elements of each method are performed are purely exemplary. Depending on the implementation, they may be performed in any order or in parallel, unless indicated otherwise in the present disclosure. Further, the logic code is not related, or limited to any particular programming language, and may be comprise one or more modules that execute on one or more processors in a distributed, non-distributed, or multiprocessing environment.

The method as described above may be used in the fabrication of integrated circuit chips. The resulting integrated circuit chips can be distributed by the fabricator in raw wafer form (that is, as a single wafer that has multiple unpackaged chips), as a bare die, or in a packaged form. In the latter case, the chip is mounted in a single chip package (such as a plastic carrier, with leads that are affixed to a motherboard or other higher level carrier) or in a multi-chip package (such as a ceramic carrier that has either or both surface interconnections or buried interconnections).

In any case, the chip is then integrated with other chips, discrete circuit elements, and/or other signal processing devices as part of either (a) an intermediate product, such as a motherboard, or (b) and end product. The end product can be any product that includes integrated circuit chips, ranging from toys and other low-end applications to advanced computer products having a display, a keyboard or other input device, and a central processor.

Therefore, it should be understood that the invention can be practiced with modification and alteration within the spirit and scope of the appended claims. The description is not intended to be exhaustive or to limit the invention to the precise form disclosed. These and various other adaptations and combinations of the embodiments disclosed are within the scope of the invention and are further defined by the claims and their full scope of equivalents.

What is claimed is:

1. A method comprising:

calculating first and second allocation speeds respectively for at least a first space and a second space in a runtime environment's memory space;

partitioning the runtime environment's memory space in proportion to said first and second space's respective allocation speeds so that the first space is filled to a first threshold level approximately at the same time as the second space is filled to a second threshold level, the partitioning for the first space performed dynamically according to the following formula:

$$SpaceSize1 = \frac{AllocSpeed1}{(AllocSpeed1 + AllocSpeed2)} * (FreeSize1 + FreeSize2) + SurvivorSize1$$

wherein:

SpaceSize1: size of the first space,

AllocSpeed1: allocation speed of the first space,

AllocSpeed2: allocation speed of the second space,

FreeSize1: free space size in the first space,

FreeSize2, free space size in the second space,

SurvivorSize1: used space size in first space;

initiating a garbage collection process in the first space and the second space when the first threshold is met; and dynamically repartitioning the first and second spaces in proportion to said first and second space's respective allocation speeds after a garbage collection event is completed in both the first space and the second space.

2. The method of claim 1, wherein the first allocation speed is approximately equal to total bytes allocated per unit time in the first space.

3. The method of claim 1, wherein the second allocation speed is approximately equal to total bytes allocated per unit time in the second space.

4. The method of claim 1 further comprising initiating a garbage collection process in the first space and the second space when the second threshold is met.

5. The method of claim 1 wherein the partitioning for the second space is performed dynamically according to the following formula:

$$SpaceSize2 = \frac{AllocSpeed2}{(AllocSpeed1 + AllocSpeed2)} * (FreeSize1 + FreeSize2) + SurvivorSize2$$

wherein: SpaceSize2: size of the second space
  AllocSpeed1: allocation speed of the first space,
  AllocSpeed2: allocation speed of the second space,
  FreeSize1: free space size in the first space,
  FreeSize2: free space size in the second space,
  SurvivorSize2: used space size in second space.

6. The method of claim 1 further comprising:
  calculating a third allocation speed associated with a third space in the runtime environment's memory space; and
  partitioning the runtime environment's memory space in proportion to said first, second and third space's respective allocation speeds so that the first, second and third spaces are respectively filled to first, second and third threshold levels at about the same time.

7. A system comprising:
  a memory manager to calculate first and second allocation speeds respectively for at least a first space and a second space in a runtime environment's memory space; and
  a garbage collector to partition the runtime environment's memory space in proportion to said first and second space's respective allocation speeds so that the first space is filled to a first threshold level approximately at the same time as the second space is filled to a second threshold level, the partitioning for the first space performed dynamically according to the following formula:

$$SpaceSize1 = \frac{AllocSpeed1}{(AllocSpeed1 + AllocSpeed2)} * (FreeSize1 + FreeSize2) + SurvivorSize1$$

$$SpaceSize2 = \frac{AllocSpeed2}{(AllocSpeed1 + AllocSpeed2)} * (FreeSize1 + FreeSize2) + SurvivorSize2$$

wherein:
  SpaceSize1: size of the first space,
  SpaceSize2: size of the second space,
  AllocSpeed1: allocation speed of the first space,
  AllocSpeed2: allocation speed of the second space,
  FreeSize1: free space size in the first space,
  FreeSize2, free space size in the second space,
  SurvivorSize1: the used space size in first space,
  SurvivorSize2: the used space size in the second space,
  the garbage collector initiating a garbage collection process in the first space and the second space when the first or the second threshold is met, and
  the garbage collector dynamically repartitioning the first and second spaces in proportion to said first and second space's respective allocation speeds after a garbage collection event is completed in both the first space and the second space.

8. The system of claim 7, wherein the first allocation speed is approximately equal to total bytes allocated per unit time in the first space and wherein the second allocation speed is approximately equal to total bytes allocated per unit time in the second space.

* * * * *